United States Patent [19]

Hobday

[11] 4,332,778

[45] Jun. 1, 1982

[54] NON-EVAPORATIVE PROCESS FOR THE PRODUCTION OF ALUMINUM SULFATE

[75] Inventor: Robert W. Hobday, Wilmington, Del.

[73] Assignee: Allied Corporation, Morris Township, Morris County, N.J.

[21] Appl. No.: 164,485

[22] Filed: Jun. 30, 1980

[51] Int. Cl.³ .................. C01G 15/00; C01F 7/74; C22B 21/00; C01F 7/26

[52] U.S. Cl. .................... 423/132; 423/128; 423/556

[58] Field of Search ............. 423/555, 556, 166, 629, 423/242 A, 128, 132

[56] References Cited

U.S. PATENT DOCUMENTS

| 2,273,930 | 2/1942 | Brown | 423/556 |
| 2,566,143 | 8/1951 | Redlich et al. | 423/132 |
| 2,958,580 | 11/1960 | Loeuenstein | 423/128 |
| 3,185,545 | 5/1965 | Scott | 423/128 |
| 3,216,792 | 11/1965 | Upy | 423/128 |
| 3,393,975 | 7/1968 | Mitchell et al. | 423/556 |

FOREIGN PATENT DOCUMENTS

| 700380 | 12/1964 | Canada | 423/556 |
| 50-105596 | 8/1975 | Japan | 423/132 |

Primary Examiner—Gary P. Straub
Attorney, Agent, or Firm—Thomas D. Hoffman

[57] ABSTRACT

A non-evaporative process for the production of drier aluminum sulfate is disclosed. A purified alum liquor containing 6 to 11% alumina as $Al_2O_3$ is contacted with aluminum trihydrate and additional sulfuric acid in amounts sufficient to produce drier, low iron aluminum sulfate.

9 Claims, No Drawings

NON-EVAPORATIVE PROCESS FOR THE PRODUCTION OF ALUMINUM SULFATE

BACKGROUND OF THE INVENTION

This invention relates to a process for the production of aluminum sulfate and, more particularly relates to a non-evaporative process for the production of drier aluminum sulfate.

In the prior art, a pure aluminum sulfate product has been prepared by digesting pure aluminum trihydrate, a product of the Bayer process, with sulfuric acid. Although the resultant aluminum sulfate product is free from impurities, e.g., iron, the cost of the pure aluminum trihydrate starting material renders the process uneconomical from a practical commercial standpoint.

In U.S. Pat. No. 3,226,188, a process for the production of aluminum sulfate melt having 14 to 20% by weight $Al_2O_3$ by reaction under pressure of aluminum hydroxide and sulfuric acid is disclosed.

Aluminum sulfate has also been prepared by reaction of an alumina-bearing ore, e.g., bauxite or clay with sulfuric acid at an elevated temperature. See, for example, U.S. Pat. No. 3,079,228. As is known, bauxite and especially more abundant aluminum-bearing clays contain impurities, particularly iron, and thus, the crude alum liquors produced therefrom contained, in addition to 6 to 11% alumina calculated as $Al_2O_3$ metallic impurities (iron) and, insoluble impurities. U.S. Pat. Nos. 3,323,865 and 3,479,136 disclose processes for removing metallic impurities such as iron from crude alum liquor. The insoluble impurities have been separated from the hot liquor which has been then evaporated to remove sufficient water to produce dry aluminum sulfate, $Al_2(SO_4)_3.14H_2O$. Due to increased raw material costs, domestic alumina-bearing clays have replaced the more expensive bauxite. In addition, because of increased energy costs, any reduction in evaporative processing cost of alum liquors would be desirable. U.S. Pat. No. 3,141,743, for example discloses a process for the crystallization of aluminum sulfate from a pregnant sulfuric acid solution of the same.

Accordingly, it is an object of this invention to provide a non-evaporative process for the production of pure drier aluminum sulfate, especially pure $Al_2(SO_4)_3.14H_2O$

SUMMARY OF THE INVENTION

In accordance with the present invention there is provided an improvement in the process for the production of drier aluminum sulfate wherein an alumina bearing substance containing insolubles is contacted with sulfuric acid in a reaction zone heated to a temperature sufficient to form an alum liquor containing about 6 to about 11% alumina calculated as $Al_2O_3$ and, insolubles and wherein the heated alum liquor is separated from the insolubles and the separated heated liquor is further treated to form drier aluminum sulfate. The improvement comprises admixing the separated heated alum liquor with a substance containing aluminum trihydrate and additional sulfuric acid in amounts sufficient to produce drier aluminum sulfate.

DETAILED DESCRIPTION OF THE INVENTION

The present invention provides a process for producing drier aluminum sulfate without the evaporative step practiced in the prior art, by admixing a purified alum liquor usually containing 6 to 11% by weight $Al_2O_3$ with a substance containing aluminum trihydrate and additional sulfuric acid in amounts sufficient to form a drier aluminum sulfate product, especially pure $Al_2(SO_4)_3.14H_2O$ product having a iron content of about 0.05% by weight $Fe_2O_3$.

In a specific embodiment of the present invention pure dry aluminum sulfate i.e., $Al_2(SO_4)_3.14H_2O$ is produced by contacting the separated heated alum liquor with a substance containing aluminum trihydrate and additional sulfuric acid in amounts sufficient to produce a substantially pure aluminum sulfate, $Al_2(SO_4)_3.14H_2O$ containing about 17% by weight aluminum as $Al_2O_3$ and about 0.05% by weight iron as $Fe_2O_3$.

The alum liquor is conveniently prepared by heating any pulverized alumina bearing substance containing insolubles, e.g., bauxite, calcined clays or raw clays containing insoluble impurities with sulfuric acid, conveniently 66 Be sulfuric acid in a digester of standard design at a temperature in the range of about 110°–125° C. for several hours until the reaction between the alumina bearing substance and the sulfuric acid is completed. The crude alum liquor is then treated by settling and decanting to remove the insolubles. In the prior art the purified hot alum liquor usually containing 6 to 11% by weight alumina as $Al_2O_3$ was then evaporated until the concentration of alumina in the purified alum liquor approaches about 17% by weight alumina. After cooling this hot 17% alumina solution, a dry, low iron (0.05% iron as $Fe_2O_3$) solid $Al_2(SO_4)_3.14H_2O$ formed which was crushed and ground.

In accordance with the invention it has been discovered that the alum liquor evaporative step in the above described prior art process can be eliminated by admixing with the separated heated alum liquor, a substance containing aluminum trihydrate and additional sulfuric acid in amounts sufficient to produce 17% alumina solution while maintaining the temperature of the admixture in the range between about 120° and about 155° C. for at least about 50 minutes. In a preferred embodiment of the present invention the sulfuric acid is contacted with the alum liquor containing 8 to 11% by weight alumina, calculated as $Al_2O_3$, in a digester maintained at a temperature in the range of about 80° to about 120° preferably 95° to 115° C. and substantially pure aluminum trihydrate is forwarded to the digester containing the sulfuric acid-alum mixture. The temperature of the exothermic reaction mixture produced in the digester is maintained in the range of between about 120° and about 155° C., preferably 125° to 150° C., more preferably 135° to 150° C. for at least about 30 minutes. After an additional 30 minute digestion time, the reaction mixture is removed from the digester, cooled and seeded; dry aluminum sulfate ($Al_2(SO_4)_3.14H_2O$) is recovered containing at least 17% alumina calculated as $Al_2O_3$. In an alternate preferred embodiment, substantially pure aluminum trihydrate is slurried with the alum liquor and the resultant mix is forwarded to a digester containing sulfuric acid. A dry crystalline aluminum sulfate product is recovered from the mixture without employing the evaporative step previously required. The aluminum sulfate contained on the average less than about 1% by weight insolubles, preferably less than about 0.75% insolubles and about 0.05% by weight iron as $Fe_2O_3$.

While it has been found convenient to use substantially pure aluminum trihydrate ($Al_2O_3.3H_2O$) in the preferred embodiments of the present invention, any impure substances containing aluminum trihydrate, e.g. wet filter cake from the Bayer process, are also considered within the scope of the present invention.

The alum liquor is separated from the insoluble impurities by conventional settling and filtration methods. These methods are well known to those skilled in the art. The equipment employed in the practice of the present invention is considered to be within the knowledge of one reasonably skilled in the art.

The following examples illustrate the present invention.

EXAMPLE 1

Bauxite ore was digested with sulfuric acid and the insoluble impurities were separated to give a purified alum sulfate liquor containing 8.3% by weight alumina as $Al_2O_3$. To 872.0 g of 93.35% by weight sulfuric acid in a 2000 ml beaker packed in vermiculite, was added slowly, with stirring, 700.0 g of this purified 8.3% by weight alum liquor. Approximately 6 drops of Ivory ® liquid detergent were added to this mix. Then, 436.0 g of aluminum trihydrate, Reynolds RH31F hydrate, was added, in small portions, to the alum-sulfuric acid mix at a temperature of 203° F. (107° C.) as mixing was continued. The temperature of the exothermic reaction mixture so produced reached 266° F. (130° C.). The temperature was maintained between 129° and 130° C. throughout the addition (20 minutes). The resultant mixture was digested for an additional 30 minutes. The aluminum sulfate product $Al_2(SO_4)_3.14H_2O$ was analyzed to contain 17.58% by weight alumina as $Al_2O_3$, 0.26% by weight free $H_2SO_4$ and 0.17% by weight insolubles.

EXAMPLE 2

In a procedure similar to Example 1, 712.0 g of alum liquor (8.44% by weight $Al_2O_3$) was slowly added, with mixing, to 875.0 g of 93.35% by weight sulfuric acid. Approximately 8 drops of Ivory ® liquid detergent were then added to this mix. The temperature of the acid-alum liquor mixture was maintained at 188.6° F. (98° C.). 440.0 g of aluminum trihydrate were added in small portions. After approximately half of the trihydrate was added, a small amount of the reaction mixture overflowed. Small amounts of water were added several times to control this overflow. The reaction temperature at the completion of the addition was 258.8° F. (142° C.). The reaction was heated with mixing for an additional 20 minutes. Seed crystals of $Al_2(SO_4)_3.14H_2O$ were added to the cooled reaction mixture and the mixture was poured into a cooling pan. Analysis of the aluminum sulfate product showed the following: 17.04% by weight alumina as $Al_2O_3$, 0.10% by weight free $Al_2O_3$, 0.05% iron as $Fe_2O_3$ and 0.62% by weight insolubles.

EXAMPLE 3

This example is similar to Example 1 except that a more concentrated alum liquor (842.17 g) containing 11% by weight alumina as $Al_2O_3$ was added to 772.79 grams of 93.35% by weight sulfuric acid. Aluminum trihydrate (385.05 g) was added very slowly to the alum-acid mixture. The temperature was maintained between 126.5° and 127° C. Small amounts of Ivory ® liquid detergent were added several times to control foaming. Digestion was continued an additional 20 minutes after the addition of aluminum trihydrate was complete. The product aluminum sulfate $(Al_2(SO_4)_3.14H_2O)$ was analyzed to contain 17.39% by weight total alumina, 0.05% by weight iron as $Fe_2O_3$, 0.27% by weight free $Al_2O_3$, and 0.83% by weight insolubles.

I claim:

1. In a process for producing drier aluminum sulfate wherein an alumina-bearing substance containing insoluble impurities is contacted with sulfuric acid in a reaction zone heated to a temperature sufficient to form an alum liquor containing about 6 to about 11% alumina as $Al_2O_3$ and insoluble impurities and wherein the heated alum liquor is separated from the insoluble impurities and wherein the separated heated alum liquor is further treated to produce drier aluminum sulfate, the improvement which consisting essentially of admixing the separated heated alum liquor with a substance containing aluminum trihydrate and additional sulfuric acid in amounts sufficient to produce aluminum sulfate substance consisting essentially of $Al_2(SO_4)_3$ and containing about 17% by weight aluminum as $Al_2O_3$, while maintaining the temperature of the admixing in the range of about 120° to about 155° C.

2. A process as described in claim 1 wherein the temperature of the admixing of the separated heated alum liquor with a substance containing aluminum trihydrate and additional sulfuric acid is maintained in the range of 125° and 130° C.

3. A process as described in claim 1 wherein the separated heated alum liquor contains a about 8 to 11% alumina as $Al_2O_3$.

4. A process as described in claim 1 or 2 wherein the temperature of the separated heated alum liquor forwarded for admixture with the substance containing aluminum trihydrate and additional sulfuric acid is maintained at a temperature in the range between about 80° and 120° C.

5. A process as described in claim 1 wherein the temperature of about 120° to about 155° C. is maintained during the admixing for at least about 50 minutes.

6. A process as described in claim 5 wherein the temperature of the admixing is maintained between 125° and 150° C.

7. A process as described in claim 6 wherein the temperature of the admixing is maintained between 135° and 150° C.

8. A process as described in claim 1 wherein the improvement further comprises admixing the aluminum trihydrate with the purified alum liquor to form a slurry which is then contacted with the additional sulfuric acid.

9. A process as described in claim 1 wherein the improvement further comprises admixing the additional sulfuric acid with the purified alum liquor to form a slurry which is then contacted with the aluminum trihydrate.

* * * * *